US006661497B2

(12) United States Patent
Tabata et al.

(10) Patent No.: US 6,661,497 B2
(45) Date of Patent: Dec. 9, 2003

(54) ILLUMINATION APPARATUS USING LIGHT GUIDE

(75) Inventors: Masami Tabata, Kamakura (JP); Tatsundo Kawai, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 09/985,115

(22) Filed: Nov. 1, 2001

(65) Prior Publication Data

US 2002/0030803 A1 Mar. 14, 2002

Related U.S. Application Data

(62) Division of application No. 09/467,982, filed on Dec. 21, 1999, now Pat. No. 6,333,779.

(30) Foreign Application Priority Data

Dec. 24, 1998 (JP) .......................... 10-366926
Dec. 24, 1998 (JP) .......................... 10-366932

(51) Int. Cl.[7] ............... G03B 27/72; G03B 27/52; H01L 27/00; H04N 1/04
(52) U.S. Cl. ............... 355/69; 355/41; 250/208.1; 358/475
(58) Field of Search ............... 355/41, 55, 57, 355/67, 68, 70, 40, 71, 69; 250/208.1, 235, 239; 358/471, 475, 484

(56) References Cited

U.S. PATENT DOCUMENTS

| 4,680,644 A | 7/1987 | Shirato et al. ............... 358/294 |
|---|---|---|
| 4,791,493 A | 12/1988 | Ogura et al. ............... 358/294 |
| 4,920,431 A | 4/1990 | Ogura et al. ............... 358/496 |
| 4,926,058 A | 5/1990 | Iwamoto et al. ............ 250/578 |
| 4,996,606 A | 2/1991 | Kawai et al. ............... 358/475 |
| 5,101,285 A | 3/1992 | Kawai et al. ............... 358/471 |
| 5,187,595 A | 2/1993 | Kitani et al. ............... 358/482 |
| 5,233,442 A | 8/1993 | Kawai et al. ............... 358/482 |
| 5,272,548 A | 12/1993 | Kawai et al. ............... 358/482 |
| 5,717,502 A | 2/1998 | Kawai ........................ 358/471 |
| 5,880,852 A | 3/1999 | Asano et al. ............... 358/296 |
| 5,900,622 A | 5/1999 | Ogura et al. ............... 250/208 |
| 5,903,401 A | 5/1999 | Tanaka et al. .............. 359/806 |
| 5,965,870 A | 10/1999 | Tabata ........................ 250/208 |
| 5,986,253 A | 11/1999 | Tabata ........................ 250/208 |
| 6,002,494 A | 12/1999 | Tabata ........................ 358/475 |

*Primary Examiner*—Henry Hung Nguyen
(74) *Attorney, Agent, or Firm*—Fitzpatrick, Cella, Harper & Scinto

(57) ABSTRACT

There is disclosed a light guide for guiding light from a light source in a longitudinal direction and radiating the light to illuminate an object to be illuminated, which includes a diffuser for diffusing the light from the light source along the longitudinal direction of the light guide, and a radiator for radiating the light diffused by the diffuser in a predetermined direction. By arranging the diffuser and the radiator so that a normal line passing through the center of the width of the diffuser is different from the predetermined direction at least in the vicinity of the light source when viewed in the longitudinal direction of the light guide, the illuminance distribution of the longitudinal direction of the light guide is uniformed.

45 Claims, 12 Drawing Sheets

PIN NO. (1) (2) (3) (4)

$\theta \geq \theta h = ASN$
(REFRACTIVE INDEX OF AIR/REFRACTIVE INDEX OF LIGHT GUIDE)

FOR LIGHT GUIDE OF ACRYLATE RESIN
$\theta h = ASN (1/1.49) = 42.16$ (deg.)

FIG. 21
PRIOR ART
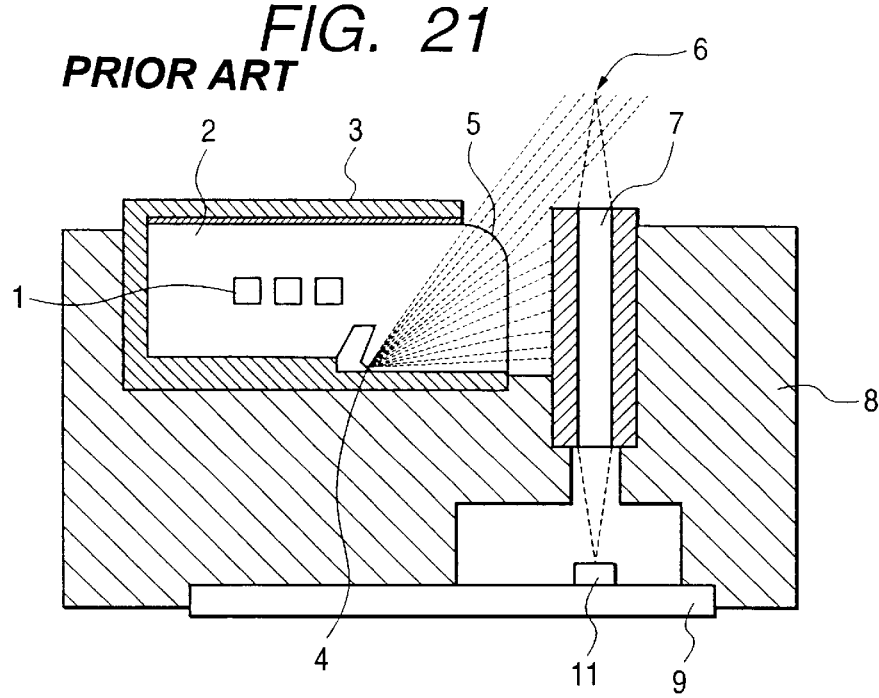
PRIOR ART FIG. 22
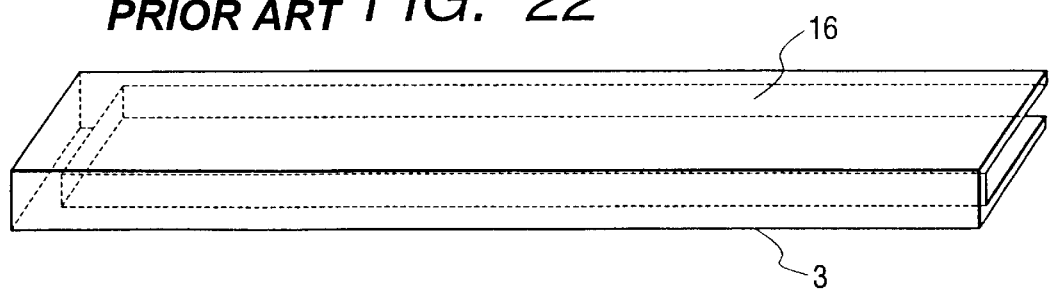
FIG. 23
PRIOR ART
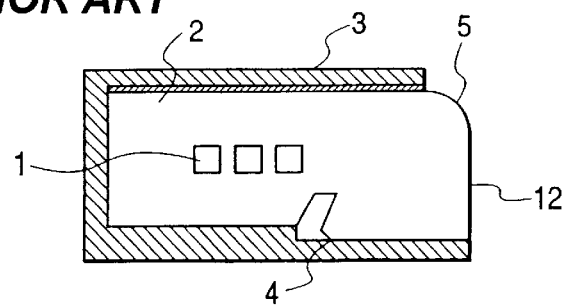

ILLUMINATION APPARATUS USING LIGHT GUIDE

This application is a division of application Ser. No. 09/467,982, filed Dec. 21, 1999 now U.S. Pat. No. 6,333,779.

BACKGROUND OF THE INVENTION

1. Field of the Invention

The present invention relates to an illumination apparatus using a light guide.

2. Related Background Art

As a conventional image reading apparatus for reading an original image, there is a contact type image sensor which contacts with an original and scans the original to read an image. One example of an illumination apparatus for use in such contact type image sensor is shown in FIGS. 18, 19 and 20. FIG. 18 is a perspective view, FIG. 19 is a sectional view, and FIG. 20 is a view of an end surface viewed from a longitudinal direction.

In FIG. 18, light radiated from a light emitting element 1 such as LED as a light source disposed on an end surface 12 of a light guide 2 is incident upon the inside of the light guide 2, repeatedly reflected by the inner face of the light guide 2 and thereby guided in the longitudinal direction of the light guide 2. A part of the light guide 2 is provided with a diffusing surface 4 for diffusing and/or reflecting the light incident along the longitudinal direction. Then as shown in FIG. 19, when the light repeatedly reflected by the inner face in the longitudinal direction is incident upon the diffusing surface 4, the incident light is scattered, a part of the light radiates from a radiating surface 13 of the light guide 2, and contributes to the illumination of the original as illumination light.

However, in the above-described conventional illumination apparatus, since there is a large amount of light directly incident upon the diffusing surface in the vicinity of the light emitting element in the light guide, and the regular reflected light from the diffusing surface contributes as the illumination light to the object to be illuminated, the illuminance of the vicinity of the light emitting element is higher than that of other areas, and a problem arises that non-uniformity is caused in the illuminance of the longitudinal direction of the light guide.

Moreover, there is one example of a conventional contact type image sensor as shown in FIG. 21.

In FIG. 21, the light radiated from the light source 1 constituted of the light emitting elements such as LED disposed on the end surface of the light guide 2 is incident upon the inside of the light guide 2, repeatedly reflected by the inner face of the light guide 2 and thereby guided in the longitudinal direction of the light guide 2. A part of the light guide 2 is provided with the diffusing surface 4 along the longitudinal direction, the light repeatedly reflected by the inner face in the longitudinal direction is scattered upon incidence on the diffusing surface 4, and a part of the light contributes as the illumination light to illuminate the original.

Here, a light guide cover 3 as shown in FIG. 22 is disposed outside the light guide 2 to enhance the light utilization efficiency, and attached so as to cover the light guide via an air layer so that the light leaking from the light guide 2 in a direction different from the original irradiation direction is returned into the light guide. To this end, the light guide cover 3 is formed, for example, of a white material with high light reflecting properties. An original (not shown) positioned on a read line 6 is irradiated with the light radiated from a radiating surface 5 (the surface of the light guide 2 radiating the light which contributes to the lighting of the original as the object to be illuminated) of the light guide 2 in an opening 16 of the light guide cover 3, and the reflected light is formed into an image by a rod lens array 7 on a line sensor 11 disposed on a sensor array 9. When the line sensor 11 converts the information of the light formed into the image to an electric signal and outputs the signal, the reading of the original is carried out.

FIG. 23 is a view only showing the light guide 2 having LED 1 in its end portion and the light guide cover 3. Since the light guide cover 3 covering the light guide 2 is manufactured mainly by injection molding, one side in a metal mold extracting direction forms an opening to extract the metal mold. Therefore, the opening of the light guide cover 3 is larger than the radiating surface 5 of the light guide 2, and the light not contributing to the illumination of the original as the object to be illuminated leaks from the side surface 12 of the light guide 2, which is a large cause for a decrease of the light utilization efficiency.

SUMMARY OF THE INVENTION

An object of the present invention is to uniform an illuminance distribution of a longitudinal direction of a light guide in an illumination apparatus using the light guide.

To achieve the above-described object, according to one embodiment of the present invention, there is provided an illumination apparatus comprising a plurality of light sources, and a light guide for guiding light from the plurality of light sources in a longitudinal direction and radiating the light to illuminate an object to be illuminated, wherein the light guide comprises a diffuser for diffusing and/or reflecting the light from the plurality of light sources along the longitudinal direction of the light guide, and a radiator for radiating the light diffused and/or reflected by the diffuser in a predetermined direction, and wherein the diffuser and the radiator are arranged so that a normal line passing through the center of the width of the diffuser differs from the predetermined direction, and the plurality of light sources are arranged on the normal line, at least in the vicinity of the light sources when viewed from the end surface side of the longitudinal direction of the light guide.

Furthermore, by this constitution, the illuminance distribution of the longitudinal direction of the light guide can be uniformed.

Moreover, another object of the present invention is to enhance the utilization efficiency of the light radiated from the light guide.

To achieve the object, according to one embodiment of the present invention, there is provided a light guide built in a light guide cover comprising a light non-transmitting member and provided with a light transmitting member for guiding light from a light source in a longitudinal direction and radiating the light to illuminate the object to be illuminated, wherein a light leakage preventing portion for restricting light leakage is disposed in a portion other than a radiator for radiating the light in a predetermined direction in a portion exposed from the light guide cover.

By this constitution, the utilization efficiency of the light radiated from the light guide can be enhanced.

Other objects and advantages of the present invention will become apparent from the following specification and the accompanying drawings.

BRIEF DESCRIPTION OF THE DRAWINGS

FIG. 21 is a sectional view of a conventional contact type image sensor.

FIG. 22 is a perspective view of a light guide cover.

FIG. 23 is a sectional view of a conventional light guide.

DETAILED DESCRIPTION OF THE PREFERRED EMBODIMENTS

Figure 1:
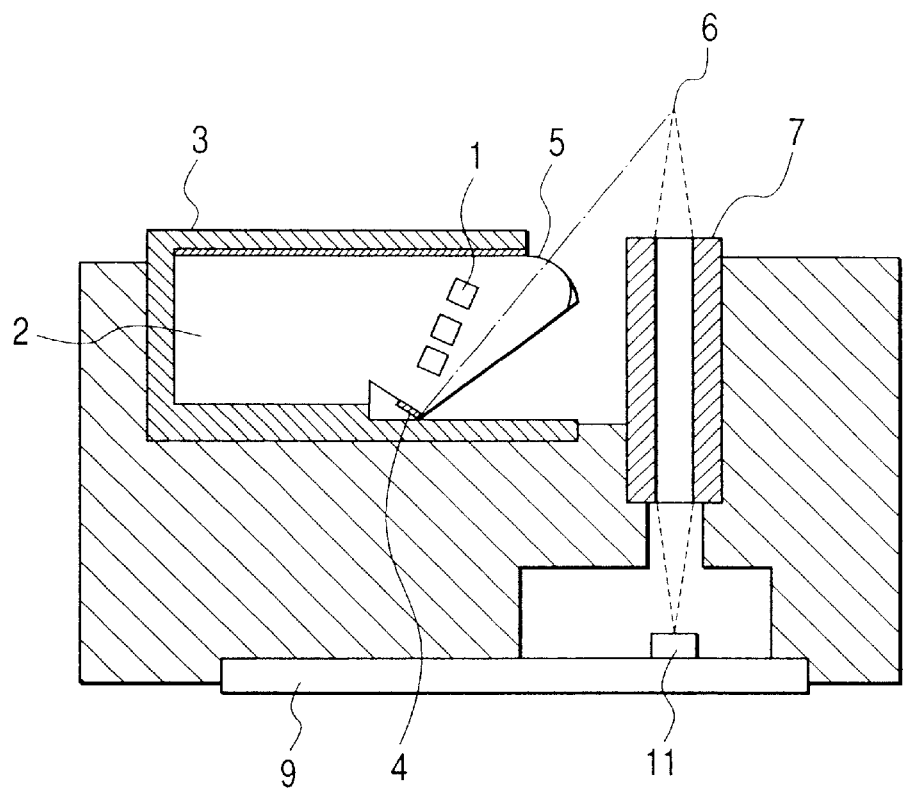
FIG. 1 is a sectional view of a contact type image sensor according to an embodiment of the present invention.
Figure 2:
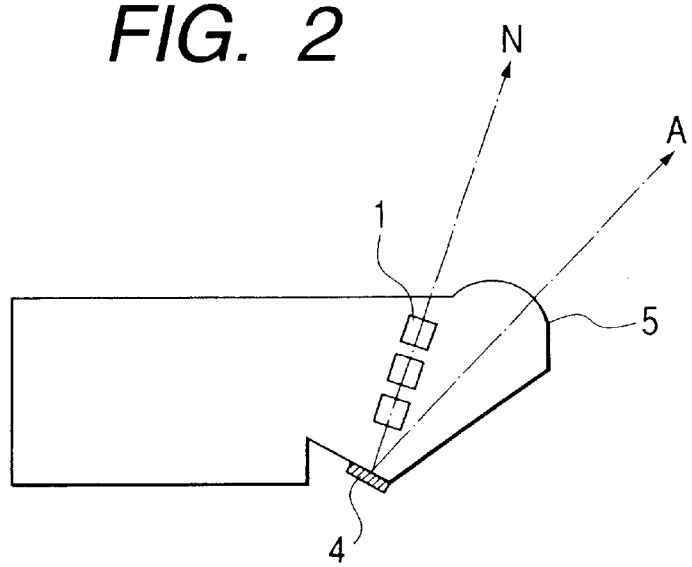
FIG. 2 is a sectional view of a light guide according to the embodiment of the present invention.

FIG. 1 is a view showing a contact type image sensor in a first embodiment of the present invention. Moreover, FIG. 2 is a sectional view of the light guide 2. In FIG. 1, the light radiated from the light source 1 constituted of the light emitting elements such as LED disposed on the end surface of the light guide 2 is incident upon the inside of the light guide 2 constituted of a light transmitting member, repeatedly reflected by the inner face of the light guide 2 and thereby guided in the longitudinal direction of the light guide 2. A part of the light guide 2 is provided with the diffusing surface 4 for diffusing and/or reflecting the incident light along the longitudinal direction. When the light repeatedly reflected by the inner face in the longitudinal direction is incident upon the diffusing surface 4 as shown in FIG. 2, the incident light is scattered and a part of the light contributes as the illumination light to illuminate the original.

The light guide cover 3 is disposed outside the light guide 2 to enhance the light utilization efficiency, and attached so as to cover the light guide via the air layer so that the light leaking from the light guide 2 in the direction different from the original irradiation direction is returned into the light guide. The light guide cover 3 is formed, for example, of a white light non-transmitting member with high light reflecting properties. The original (not shown) positioned on the read line 6 is illuminated with the light radiated from the radiating surface 5 (the surface of the light guide 2 radiating the light which contributes to the lighting of the original as the object to be illuminated) of the light guide 2 in the opening of the light guide cover 3, and the reflected light is formed into an image by the rod lens array 7 on the line sensor 11 disposed on the sensor array 9. When the line sensor 11 converts the information of the light formed into the image to an electric signal and outputs the signal, the reading of the original is carried out. Here, in the present embodiment, by forming the radiating surface 5 in a lens shape, the surface is constituted so that a more intense light can be converged on the read line 6.

FIG. 2 is a view showing only the light guide 2 having in its end portion the light emitting elements 1 such as LED constituting the illumination apparatus of the contact type image sensor shown in FIG. 1. As shown in FIG. 2, in the light guide of the present embodiment, three light emitting elements 1 are arranged on a normal line N substantially passing through the center of the width of the diffusing surface. Here, the number of LEDs as the light emitting elements is not limited to three, and for example, only one may be disposed. When the normal line passing through the center of the width of the diffusing surface is identical to the illumination direction of the original, the illuminance becomes intense in the end portion in which the light emitting elements 1 are arranged as in the conventional art, and a non-uniform irradiation characteristic is provided in the longitudinal direction. Therefore, in the present embodiment, when viewed from the end surface side of the longitudinal direction of the light guide in the sectional view of FIG. 1 or 2, the normal line N passing through the center of the width of the diffusing surface is allowed to be different from the direction in which the original is illuminated.

In the above-described constitution, since the light is directly incident upon the diffusing surface of the light guide, and the regular reflected light from the diffusing surface does not directly contribute as the illumination light of the object to be illuminated, a uniform illuminance distribution can be obtained in the longitudinal direction. Moreover, since a part of the light other than the regular reflected light is radiated from the radiating surface, and contributes as the illumination light of the object to be illuminated, the vicinity of the light source is prevented from becoming excessively dark. Since a predetermined illuminance can be obtained, the total length of the light guide in the longitudinal direction can be shortened.

Moreover, since a plurality of light sources are arranged in one row on the normal line passing through the center of the width of the diffusing surface, particularly in the case of independently lighting/driving each light source, the illuminance distribution obtained by each light source has substantially the same configuration. Therefore, when the illumination apparatus of the present embodiment is used in the reading apparatus, reading can be realized so that color can uniformly be reproduced over the longitudinal direction.

Figure 3:
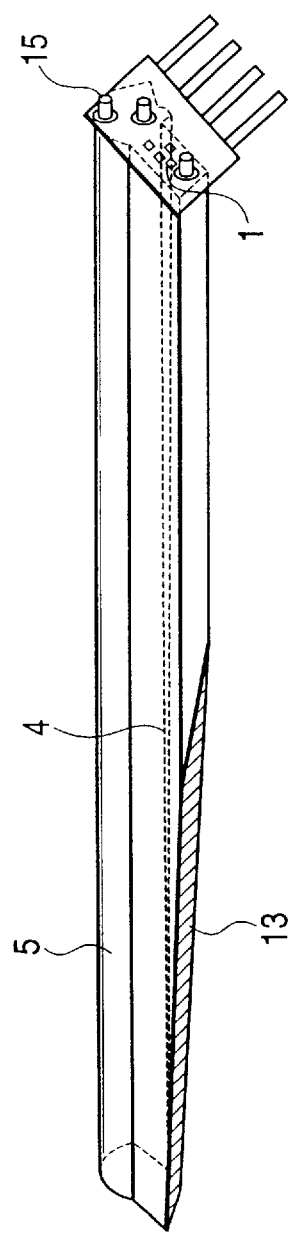
FIG. 3 is a perspective view of the light guide according to the embodiment of the present invention.

FIG. 3 shows a perspective view of the light guide 2 in the present embodiment. As shown in FIG. 3, the light guide of the present embodiment is provided with a tapered surface 13 so that the sectional area of the light guide becomes smaller when farther from the end portion with the light emitting elements 1 arranged thereon. Even if the tapered surface 13 is disposed, a uniform light can be obtained over the longitudinal direction, but by disposing the tapered surface, the original can be irradiated with the light of a further uniform light emitting intensity over the entire area in the longitudinal direction of the light guide 2.

A second embodiment will be described in which the present invention is applied to the image sensor for reading a color image. In order to read the color image, in the present embodiment, three color light emitting elements of red (R), green (G) and blue (B) are used, and the original is illuminated by successively switching and lighting each color light source. Subsequently, the light information of three colors R, G, B obtained from the original is formed into an image on the line sensor 11 by the lens array, and the line sensor 11 converts the light information of three colors R, G, B into an electric signal, so that, a color image signal can be obtained.

Figure 4:
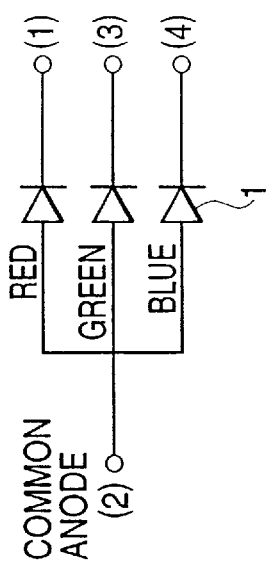
FIG. 4 shows an equivalent circuit LED according to the embodiment of the present invention.
Figure 5A:
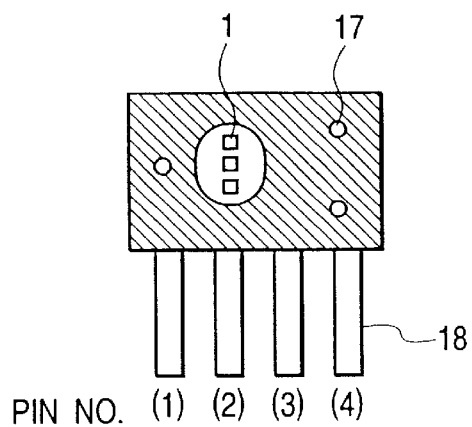
FIGS. 5A and 5B are schematic views of the LED according to the embodiment of the present invention.
Figure 5B:
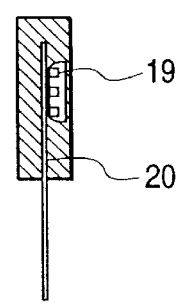
Figure 6:
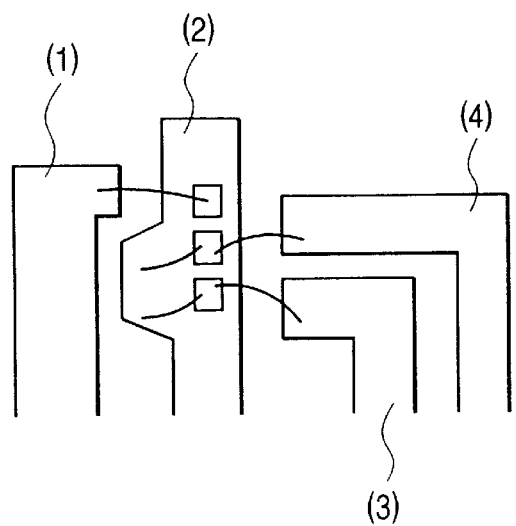
FIG. 6 is a schematic view of the LED according to the embodiment of the present invention.

FIG. 4 shows an equivalent circuit when the LED light source is used as color light emitting elements. As shown in FIG. 4, the LEDs are constituted of independent cathodes and a common anode. FIGS. 5A, 5B are views showing a case molded type LED light source. FIG. 5A is a top view of the case molded type color LED light source, FIG. 5B is a sectional view thereof, and FIG. 6 is a view showing the connection state of each LED onto a lead frame. This case molded type LED light source is manufactured as follows: First, a lead frame 18 is inserted to a metal mold, and injection molding is performed, so that the portion of the lead frame 18 other than the portion with the LED elements mounted thereon is covered with a white resin 20 with high light reflecting properties. Subsequently, the anodes of three color LED elements of R-LED element, G-LED element, B-LED element are connected to a common base pin (2) of the lead frame 18, and cathodes are further connected to color dedicated pins (1), (3), (4) of the lead frame. Subsequently, by potting a light transmitting resin 19 on the three color LED elements, the LED light source is completed. Subsequently, by inserting a positioning pin 15 of the light guide 2 to a positioning hole 17 as shown in FIG. 3, and caulking the positioning pin 15 with heat, ultrasonic wave, and the like, the light source can correctly be positioned and fixed. Additionally, in the above-described embodiments, the examples in which the LEDs are used as the light emitting elements have been described, but the present invention is not limited to the examples, and other light emitting elements may be used.

Moreover, since the plurality of light sources are mounted on the common electrode, the light sources can closely be mounted, so that the corresponding light guide can be thinned.

As described above, according to the present invention, the object to be illuminated can be illuminated with the light which has a uniform illuminance distribution over the longitudinal direction of the light guide.

Figure 7:
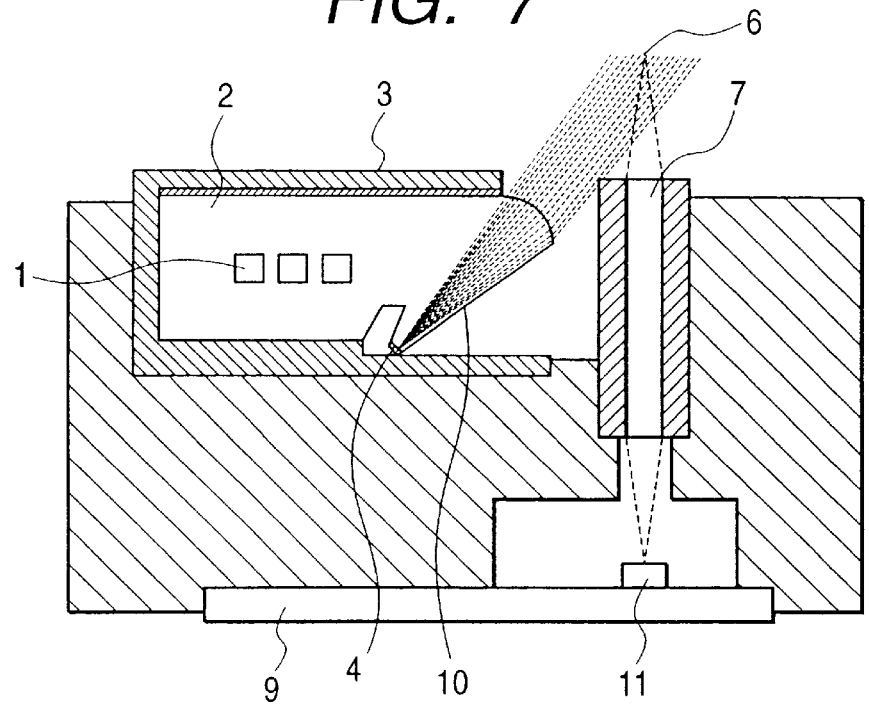
FIG. 7 is a sectional view of the contact type image sensor in the embodiment of the present invention.
Figure 8:
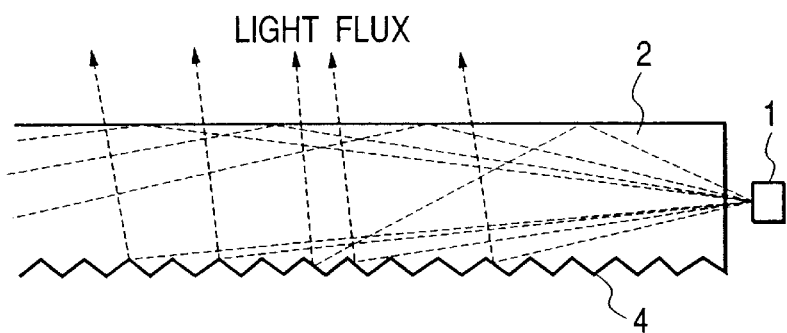
FIG. 8 is a side view of the light guide in the embodiment of the present invention.
Figure 9:
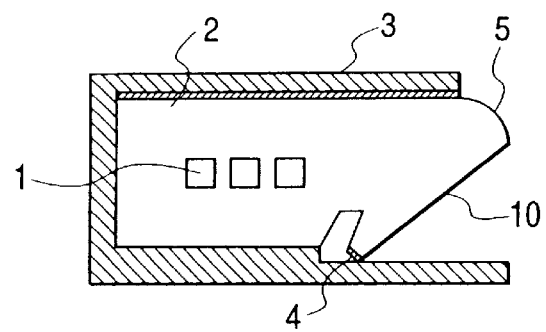
FIG. 9 is a sectional view of the light guide in the embodiment of the present invention.

FIG. 7 is a view showing the contact type image sensor in a third embodiment of the present invention. Moreover, FIG. 8 is a sectional view of the light guide 2. In FIG. 9, the light radiated from the light source 1 constituted of the light emitting elements such as LED disposed on the end surface of the light guide 2 is incident upon the inside of the light guide 2 constituted of the light transmitting member, repeatedly reflected by the inner face of the light guide 2 and thereby guided in the longitudinal direction of the light guide 2. A part of the light guide 2 is provided with the diffusing surface 4 along the longitudinal direction. When the light repeatedly reflected by the inner face in the longitudinal direction is incident upon the diffusing surface 4 as shown in FIG. 8, the incident light is diffused and/or reflected and a part of the light contributes as the illumination light to illuminate the original.

The light guide cover 3 as shown in FIG. 22 is disposed outside the light guide 2 to enhance the light utilization efficiency, and attached so as to cover the light guide via the air layer so that the light leaking from the light guide 2 in the direction different from the original illumination direction is returned into the light guide. The light guide cover 3 is formed, for example, of a white light non-transmitting member with high light reflecting properties. The original (not shown) positioned on the read line 6 is illuminated with the light radiated from the radiating surface 5 (the surface of the light guide 2 radiating the light which contributes to the illumination of the original as the object to be illuminated) of the light guide 2 in the opening of the light guide cover 3, and the reflected light is formed into an image by the rod lens array 7 on the line sensor 11 disposed on the sensor array 9. Subsequently, when the line sensor 11 converts the information of the light formed into the image to an electric signal and outputs the signal, the reading of the original is carried out. Here, in the present embodiment, by forming the radiating surface 5 in a lens shape, the surface is constituted so that a more intense light can be converged on the read line 6.

FIG. 9 is a view showing only the light guide 2 having in its end portion the light emitting elements 1 such as LED constituting the illumination apparatus of the contact type image sensor shown in FIG. 7 and the light guide cover 3. As shown in FIG. 9, in the light guide of the present embodiment, a total reflection surface 10 is disposed as a light leakage preventing portion for restricting light leakage in the portion other than the radiating surface 5 in the portion of the light guide 2 exposed to the outside in the opening of the light guide cover 3.

Figure 10:
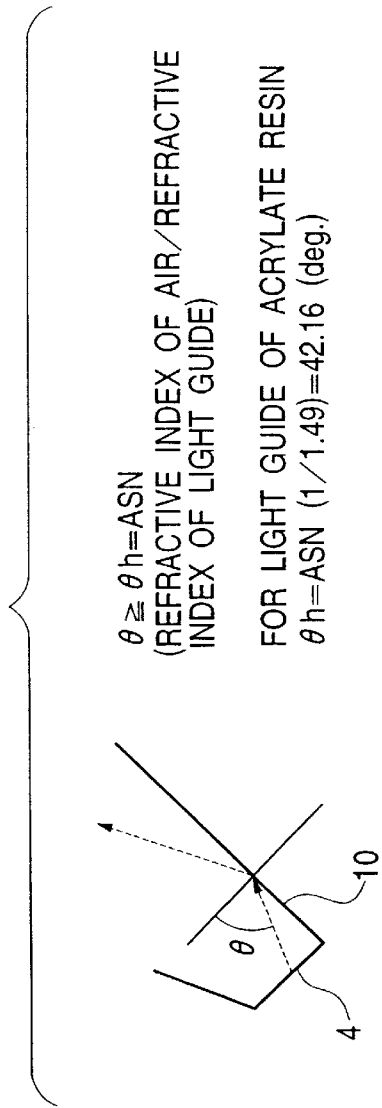
FIG. 10 is an enlarged view of the light guide in the embodiment of the present invention.

FIG. 10 is an enlarged view in the vicinity of the diffusing surface 4 and the total reflection surface 10. Here, the total reflection surface will be described which utilizes a difference of refractive index in an interface of the light guide and air. The light radiated from the light emitting element 1 is repeatedly reflected by the inner face of the light guide 2 and guided in the longitudinal direction, and among the light, the light incident upon the diffusing surface 4 illuminates the original from the radiating surface 5. When the angle of incidence of the light scattered by the diffusing surface 4 upon the total reflection surface 10 is set to θ, the total reflection surface 10 can be formed by forming the light guide 2 so that a relation of θ≧θh=ASN (refractive index of air/refractive index of light guide) is established. For example, when the light guide 2 is of acrylate resin, θh=ASN (1/1.49)=42.16 (deg.).

In the present embodiment, since the total reflection surface 10 is thus constituted of the portion other than the radiating surface 5 in the exposed portion positioned in the opening of the light guide cover 3 of the light guide 2, the conventional light leakage can be prevented. Subsequently, the light reflected by the diffusing surface 4 to reach the total reflection surface 10 is totally reflected toward the inside of the light guide 2, a part of the light is radiated from the radiating surface 5, and the light not-radiated from the radiating surface 5 is also diffused and/or reflected again by the diffusing surface 4 to act as the light for illuminating the original when reaching the radiating surface 5, so that the original can be illuminated with a sufficient illuminance.

Figure 11:
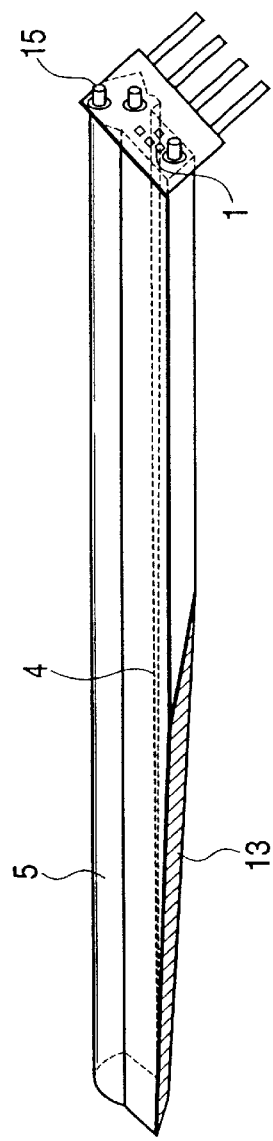
FIG. 11 is a perspective view of the light guide in the embodiment of the present invention.

FIG. 11 shows a perspective view of the light guide 2 in the present embodiment. The tapered surface 13 is disposed so that the sectional area of the light guide becomes smaller when it is farther from the end portion with the light emitting elements 1 arranged thereon. By disposing the tapered surface 13, the light emitting intensity only of the side on which the light emitting elements 1 are arranged is prevented from being strengthened, and the original can be illuminated with the light of a uniform light emitting intensity over the entire area in the longitudinal direction of the light guide 2.

Figure 12:
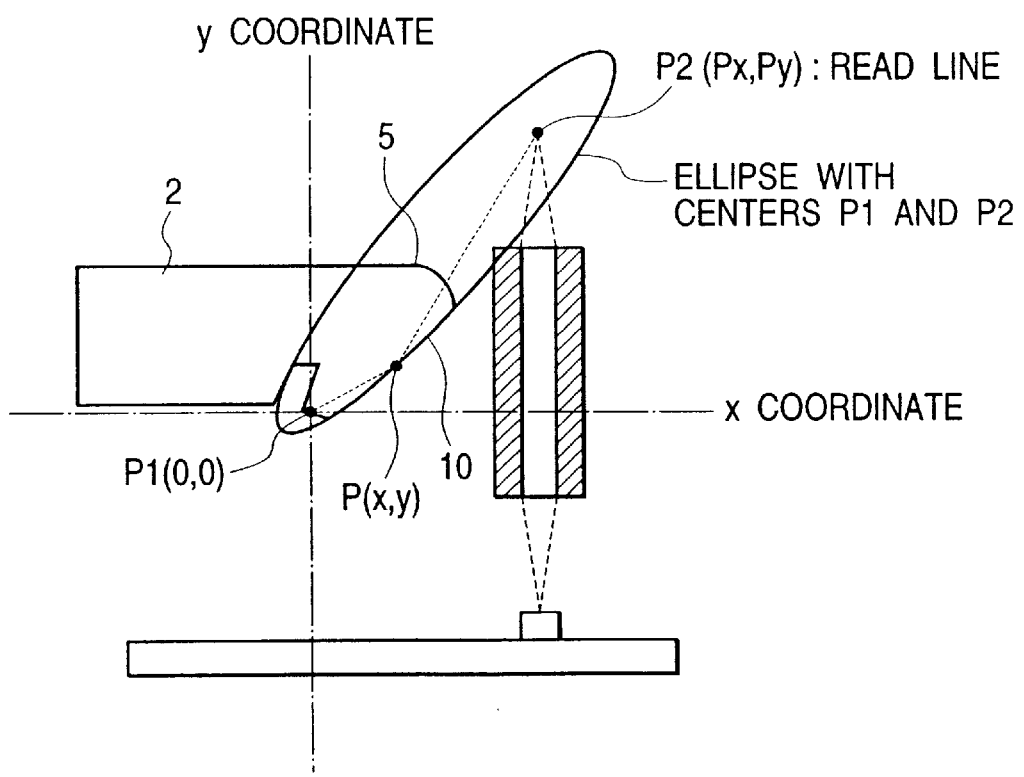
FIG. 12 is an explanatory view of a total reflection surface of the light guide in the embodiment of the present invention.

FIG. 12 is a view showing a fourth embodiment in which the total reflection surface 10 is formed as an ellipse with a point P1 as the center position of the diffusing surface 4 and a center P2 as the irradiation position (i.e., the read line by the line sensor) of the original as the object to be illuminated by the light source. When the coordinate of P1 is (0, 0), the coordinate of P2 is (Px, Py), and the coordinate of point P on the total reflection surface 10 is (x, y), the elliptic surface can be represented by the following:

$$\sqrt{(x^2+y^2)}+\sqrt{[(x-Px)^2+(y-Py)^2]}=\text{cost (constant)}$$

By forming the total reflection surface 10 as such elliptic surface, among the lights reflected by the diffusing surface 4, the light incident upon the ellipse is all reflected toward the read line P2, and converged on the read line, so that the illuminance can further be enhanced.

Figure 13A:
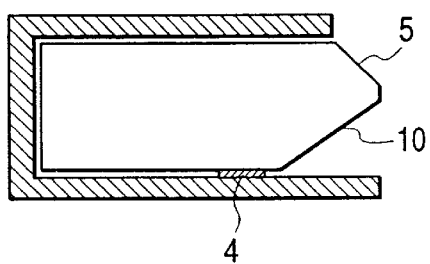
FIGS. 13A, 13B, 13C and 13D are sectional views of the light guide in the embodiment of the present invention.
Figure 13C:
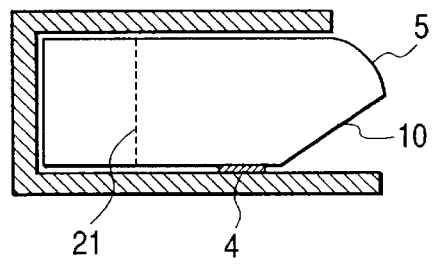
Figure 13B:
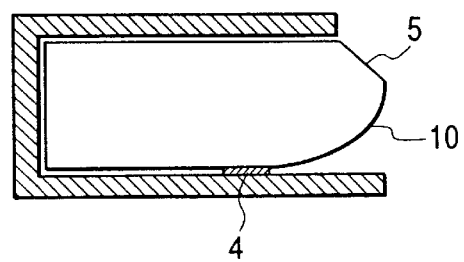
Figure 13D:
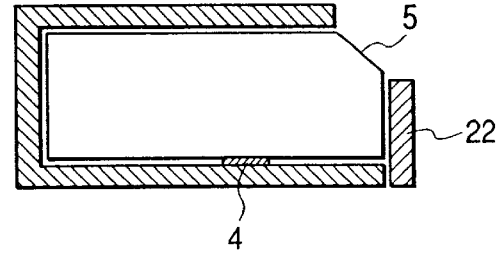

Next in a fifth embodiment, the diffusing surface 4 is formed by applying a white light diffusing ink or the like to the surface of the light guide 2 as shown in FIGS. 13A to 13D. FIG. 13A shows an example in which both the radiating surface 5 and the total reflection surface 10 are formed of flat surfaces, and FIG. 13B shows an example in which the radiating surface 5 is constituted of the flat surface and the total reflection surface 10 is formed as the elliptic surface. In FIG. 13C, the radiating surface 5 is formed in a lens shape, the total reflection surface 10 is formed of the flat surface and the tapered surface in a direction apart from the light emitting element 1, and the terminal line of the light guide 2 is shown by a dot line 21. Moreover, FIG. 13D shows an example in which the reflecting surface is constituted by constituting the radiating surface 5 of the flat surface and disposing a reflecting member 22 separately from the light guide cover 3.

In addition to this method of disposing the reflective member, and the total reflection surface by the refractive index difference in the interface of the light guide and air, the reflective surface may be formed, for example, by roughing the surface of the light guide, applying a white paint with light diffusing/reflecting properties, or by depositing a metal or applying a metal gloss paint to a portion processed in a sawtooth shape.

Figure 14:
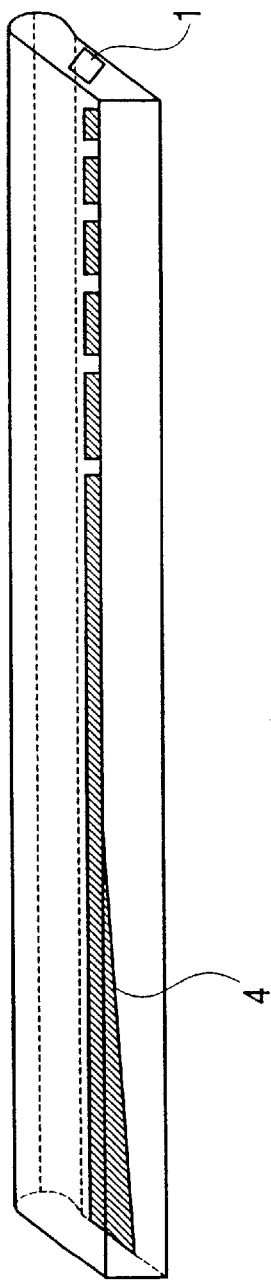
FIG. 14 is a perspective view of the light guide in the embodiment of the present invention.
Figure 15:
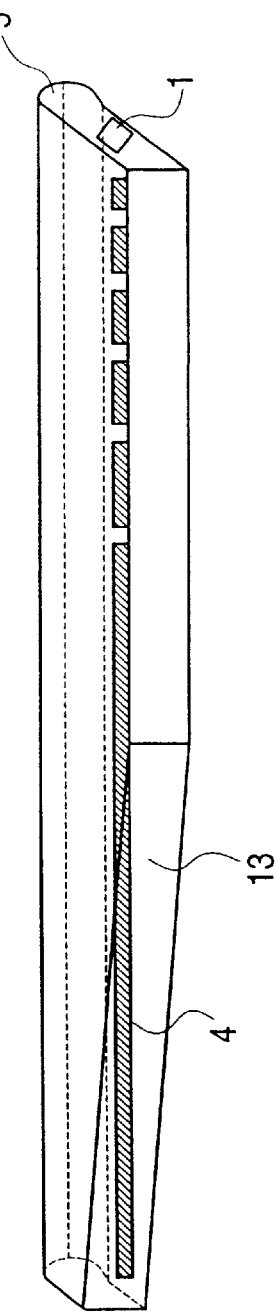
FIG. 15 is a perspective view of the light guide in the embodiment of the present invention.

As a method of setting the illuminance to be uniform over the longitudinal direction of the light guide 2, there is a method of gradually widening the width of the diffusing surface 4 as the surface is apart from the light emitting element 1 as shown in FIG. 14 when viewed from the side of the end surface of the longitudinal direction as shown in FIG. 13, or a method of reducing the sectional area of the light guide 2 apart from the light emitting element 1 by disposing the tapered surface 13 as shown in FIG. 15 when viewed from the longitudinal direction. In this method of reducing the sectional area of the light guide, the width of the diffusing surface 4 can be formed to be constant without being changed, so that compared with the case in which the radiating surface 5 is lens-shaped, the light can effectively be converged.

A sixth embodiment will next be described.

Figure 16:
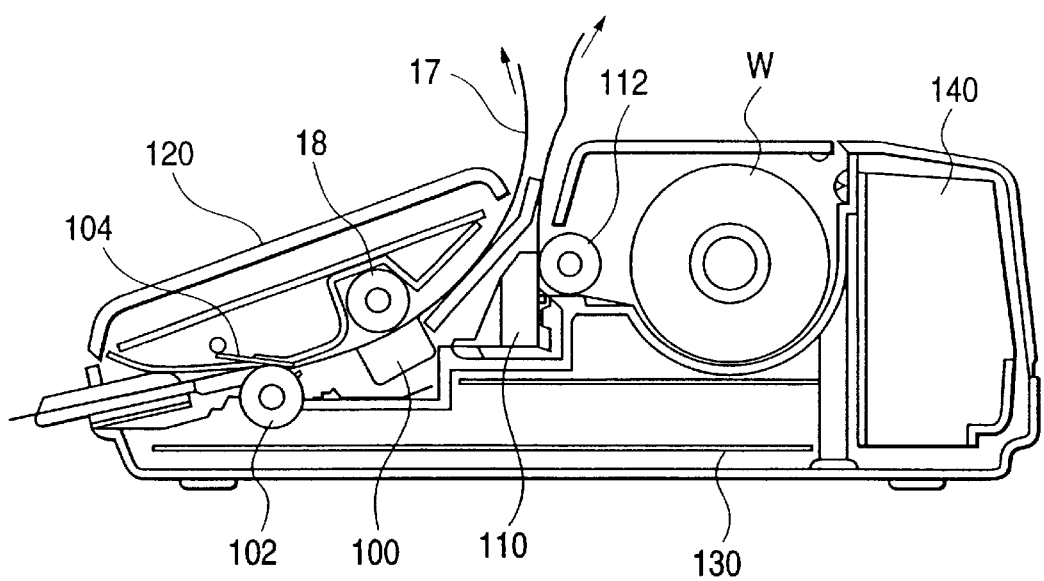
FIG. 16 is a schematic view of an information processing apparatus in the embodiment of the present invention.

FIG. 16 shows a facsimile machine having a transmitting/receiving function as an information processing apparatus which uses the contact type image sensor of the above-described embodiment. In FIG. 16, numeral 100 denotes the contact type image sensor described in the above-described embodiments, 102 denotes a sheet supply roller for supplying an original 17 as the illuminated object toward a reading position, 104 denotes a separating piece for securely separating the original sheet by sheet, and 18 denotes a conveying roller disposed in the reading position of the contact type image sensor 100 for regulating the surface to be read of the original and conveying the original.

In the shown example, character W denotes a recording medium having a roll sheet shape. A thermal head, an ink jet recording head, and the like can be used for a recording head 110 for forming images. A platen roller 112 conveys the recording medium W to a recording position by the recording head 110, and regulates the surface to be recorded.

An operation panel 120 is provided with a switch for accepting operation inputs, a display section for detecting messages or the states of other apparatuses, and the like. A system control substrate 130 is provided with a controller for controlling each section, a drive circuit for performing the lighting control of the light source of the contact type image sensor 100 and the drive control of sensors, an image information processor, a transmitter/receiver, and the like. Numeral 140 denotes an apparatus power source.

To transmit the original 17, when the telephone number, transmission mode, and the like of an addressee are inputted from the operation panel 120, the original is supplied to the reading position of the image sensor 100 by the supply roller 102. Subsequently, the image information on the original 17 is read by the image sensor 100 driven/controlled by the drive circuit, and converted to an electric signal. The converted electric signal is subjected to a predetermined image processing in the processor of the system control substrate 130, and outputted to a public circuit via the transmitter/receiver.

In the above-described sixth embodiment, the facsimile machine having the transmitting/receiving function has been described as the example of the information processing apparatus, but a seventh embodiment will be described with reference to FIG. 17 as one example of the information processing apparatus constituted by using the contact type image sensor described in the above-described embodiments. In the constitution example, an image reading apparatus 150 with a contact type image sensor 200 built therein is connected to a personal computer 160 and systematized, and a read image is transmitted to the computer or a network.

Figure 17:
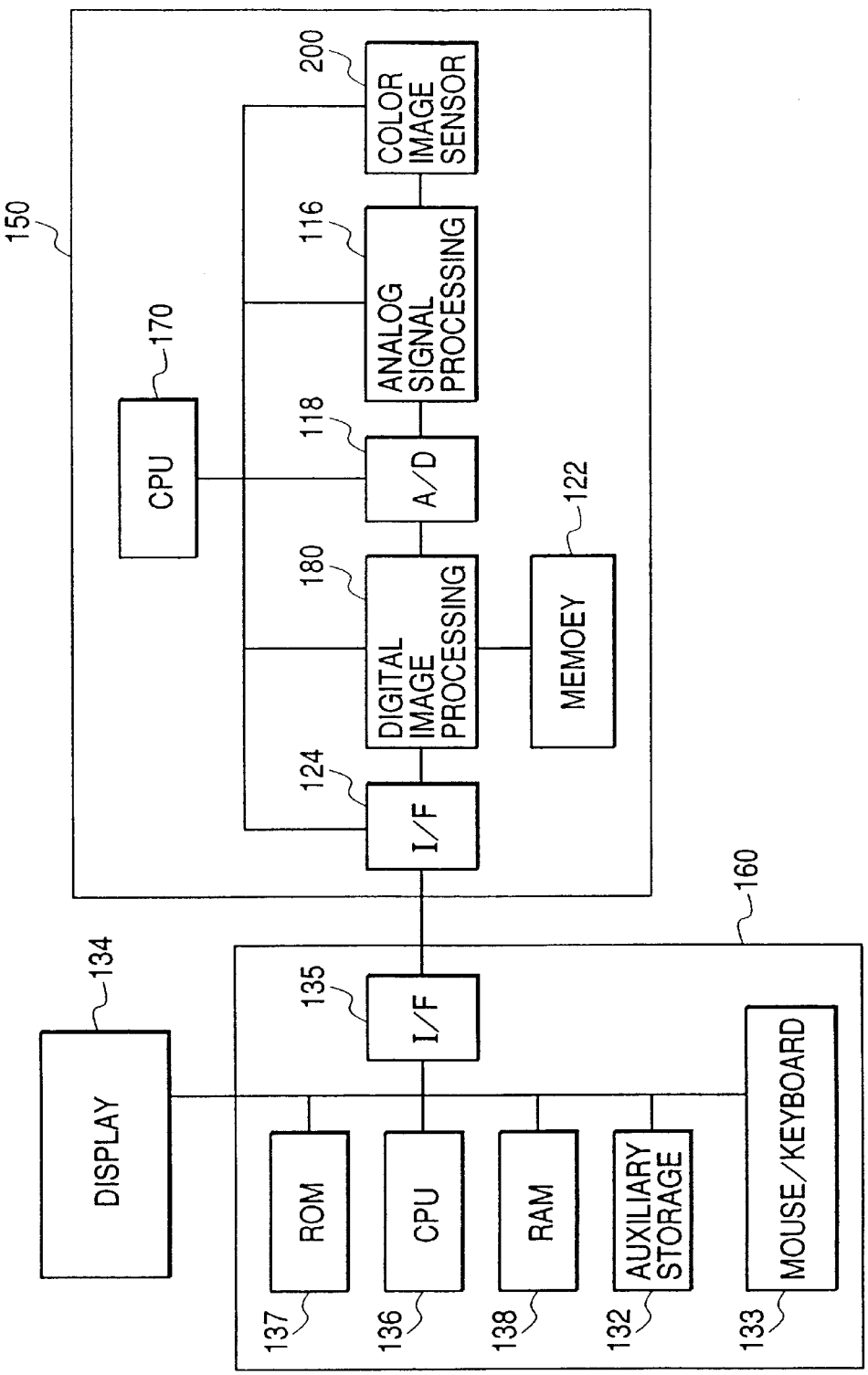
FIG. 17 is a block diagram of the information processing apparatus in the embodiment of the present invention.
Figure 18:
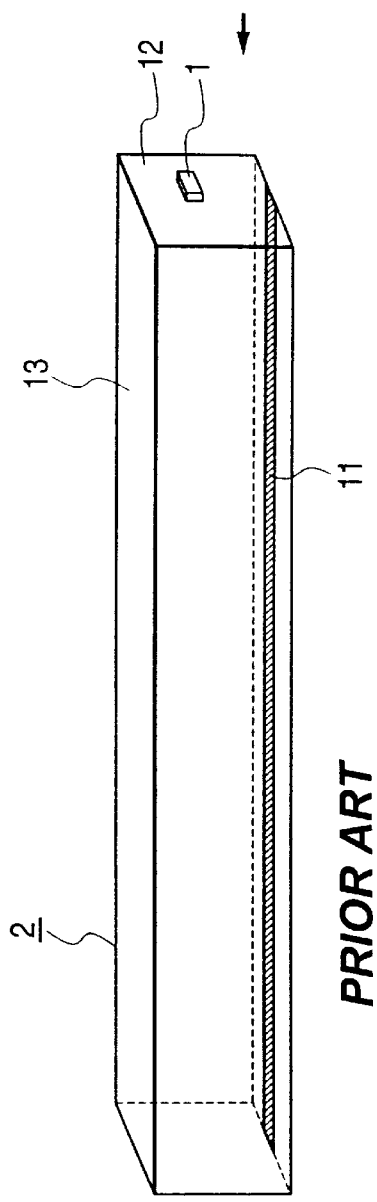
FIG. 18 is a perspective view of a conventional light guide.
Figure 20:
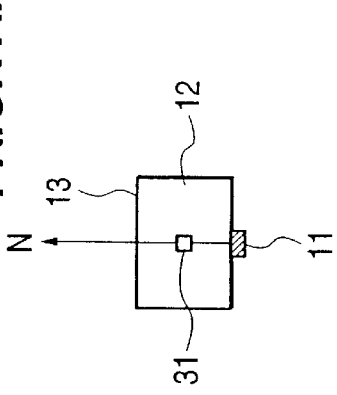
FIG. 20 is a sectional view of the conventional light guide.
Figure 19:
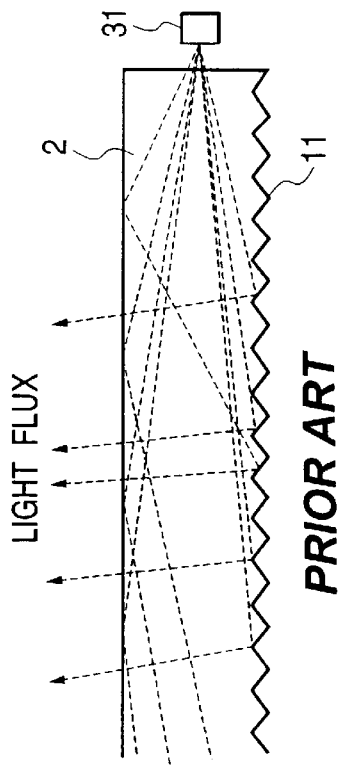
FIG. 19 is a side view of the conventional light guide.

In FIG. 17, a CPU 170 controls the entire image reading apparatus 150 as first control means, the contact type color image sensor 200 is constituted as a reading unit of the above-described light source, CCD line sensor, and the like to convert the image of the original as the illuminated object to an image signal, and an analog signal processing circuit 116 applies a gain adjustment or another analog processing to the analog image signal outputted from the contact type color image sensor 200.

Moreover, numeral 118 denotes an A/D converter for converting the output of the analog signal processing circuit 116 to a digital signal, 180 denotes an image processing circuit for using a memory 122 to apply a shading correction processing, a gamma conversion processing, a magnification change processing, or another image processing to the output data of the A/D converter 118, and 124 denotes an interface for outputting to the outside the digital image data processed by the image processing circuit 180. The interface 124 conforms to the specification employed, for example, in personal computers such as SCSI and Bi-Centronics in a standard manner, and is connected to the personal computer 160. These analog signal processing circuit 116, A/D converter 118, image processing circuit 180, and memory 122 constitute the signal processing means.

The personal computer 160 as second control means is provided with an optomagnetic disk drive, a floppy disk drive, and the like as an external storage apparatus or an auxiliary storage apparatus 132. Numeral 134 denotes a display for displaying the operation on the personal computer 160, and 133 denotes a mouse/keyboard for inputting a command, and the like to the personal computer. Moreover, 135 denotes an interface for transmitting/receiving the data, command, and image reading apparatus state information between the personal computer and the image reading apparatus.

A CPU 136 of the personal computer 160 can input a reading instruction to the CPU 170 of the image reading apparatus via the mouse/keyboard 133. Upon the input of the reading instruction by the mouse/keyboard 133, the CPU 136 transmits a reading command to the CPU 170 of the image reading apparatus via the interface 135. Subsequently, the CPU 136 of the personal computer 160 controls the CPU 170 of the image reading apparatus in accordance with the control program information stored in a ROM 137, and the CPU 170 performs the drive control of the light source and CCD and the control of the signal processing means. Additionally, the control program may be executed by the CPU 136 by reading the program stored in the storage media such as the optomagnetic disk and floppy disk attached to the auxiliary storage apparatus 132 into the personal computer 160.

By using the contact type image sensor of the present invention in the image reading system as described above and shown in FIGS. 16 and 17, the reading speed can be increased, and high resolution and high performance can be realized.

As described above, according to the present invention, the light utilization efficiency can be enhanced when the light guide is used in the illumination apparatus, and the illuminance of irradiating the lighting object can be increased. Thereby, the number of light sources such as LED can be decreased, which can realize cost reduction.

Many widely different embodiments of the present invention may be constructed without departing from the spirit and scope of the present invention. It should be understood that the present invention is not limited to the specific embodiments described in the specification, except as defined in the appended claims.

What is claimed is:

1. A contact type image sensor comprising:
   an illumination apparatus comprising a plurality of light sources, and a light guide for guiding light from said plurality of light sources in a longitudinal direction and radiating the light to illuminate an object to be illuminated;
   an image forming element for forming the light from the object to be illuminated by said illumination apparatus into an image; and
   photoelectric converting means for photoelectrically converting the light formed into the image by said image forming element and outputting an image signal,
   wherein said light guide comprises a diffuser for diffusing and/or reflecting the light from said plurality of light sources along the longitudinal direction of said light guide, and a radiator for radiating the light diffused and/or reflected by said diffuser in a predetermined direction, and wherein said diffuser and said radiator are arranged so that a normal line passing through the center of the width of said diffuser differs from said predetermined direction, and said plurality of light sources are arranged on said normal line, at least in the vicinity of said plurality of light sources when viewed from the side of the end surface of the longitudinal direction of said light guide.

2. A contact type image sensor comprising:
   an illumination apparatus comprising a light source, and a light guide built in a light guide cover of a light non-transmitting member and provided with a light transmitting member for guiding light from said light source in a longitudinal direction and radiating the light to illuminate an object to be illuminated, wherein a light leakage preventing portion for restricting light leakage is arranged in a portion other than a radiator for radiating the light in a predetermined direction in a portion exposed from said light guide cover;
   an image forming element for forming the light from the object to be illuminated by said illumination apparatus into an image; and
   photoelectric converting means for photoelectrically converting the light formed into the image by said image forming element and outputting an image signal.

3. A contact type images sensor comprising:
   an illumination apparatus comprising a light source, and a light guide for guiding light from the light source in a longitudinal direction and radiating the light to illuminate an object to be illuminated;
   an image forming element for forming the light from the object to be illuminated by said illumination apparatus into an image; and
   photoelectric converting means for photoelectrically converting the image from the image forming element and outputting an image signal,
   wherein the light guide comprises a diffuser for diffusing and/or reflecting the light from the light source along the longitudinal direction of the light guide and a radiator for radiating the light diffused and/or reflected by the diffuser in a predetermined direction, and wherein the diffuser and the radiator are arranged so that a normal line passing through the center of the width of the diffuser differs from the predetermined direction, and the light source is arranged on the normal line, when viewed from the side of the end surface of the longitudinal direction of the light guide.

4. The illumination apparatus according to claim 3, wherein the apparatus comprises a plurality of said light sources having different light emitting colors.

5. The illumination apparatus according to claim 4, wherein the plurality of light sources are mounted on a common electrode.

6. The illumination apparatus according to claim 3, wherein said light source is arranged in the end portion of the light guide.

7. The illumination apparatus according to claim 6, wherein a sectional area of the light guide becomes smaller as a distance from the arrangement position of the light source is increased, when viewed in the longitudinal direction of the light guide.

8. The illumination apparatus according to claim 3, wherein a sectional area of the light guide differs over the longitudinal direction, when viewed in the longitudinal direction of the light guide.

9. The illumination apparatus according to claim 3, wherein the radiator comprises a light converging portion for conveying the light to be radiated.

10. The illumination apparatus according to claim 9, wherein the light converging portion is formed by forming the radiator into a lens shape.

11. The illumination apparatus according to claim 3, wherein the light source is an LED.

12. A contact type image sensor comprising:
an illumination apparatus comprising a light source, and a light guide built in a light guide cover, the light guide cover comprising a light non-transmitting member, and provided with a light transmitting member for guiding light from the light source in a longitudinal direction and radiating the light from a radiating surface of the light guide to illuminate an object to be illuminated, wherein a light leakage preventing portion for restricting light leakage is arranged around a part of a surface of the light guide, exposed from the light guide cover, other than the radiating surface;
an image forming element for forming the light from the object to be illuminated by said illumination apparatus into an image; and
photoelectric converting means for photoelectrically converting the light formed into the image by said image forming element and outputting an image signal.

13. The illumination apparatus according to claim 12, further comprising a diffuser for diffusing and/or reflecting the light from said light source in the longitudinal direction of the light guide, wherein the radiating surface radiates the light diffused and/or reflected by the diffuser in a predetermined direction.

14. The illumination apparatus according to claim 13, wherein the light leakage preventing portion comprises a total reflection surface in which an incidence angle of the light diffused and/or reflected by the diffuser is equal to or more than a total reflection angle.

15. The illumination apparatus according to claim 14, wherein the total reflection angle is θh=ASN which is a ratio of a refractive index of air and a refractive index of the light guide.

16. The illumination apparatus according to claim 14, wherein the total reflection surface is a curved surface.

17. The illumination apparatus according to claim 16, wherein the total reflection surface is an elliptic curved surface with two points as centers in the diffuser and an irradiation position of the object to be illuminated.

18. The illumination apparatus according to claim 12, wherein a sectional area of the light guide changes over the longitudinal direction when viewed from the side of an end surface of the longitudinal direction of the light guide.

19. The illumination apparatus according to claim 12, wherein a sectional area of the light guide becomes smaller as a distance from the arrangement position of the light source is increased, when viewed from the side of an end surface of the longitudinal direction of the light guide.

20. The illumination apparatus according to claim 12, wherein the radiating surface comprises a light converging portion for converging the light to be radiated.

21. The illumination apparatus according to claim 12, wherein the light converging portion is formed by forming said radiating surface into a lens shape.

22. The illumination apparatus according to claim 12, wherein the light leakage preventing portion comprises a reflecting member disposed separately from the light guide.

23. The illumination apparatus according to claim 12, wherein the light leakage preventing portion is constituted by roughing the surface of the light guide.

24. The illumination apparatus according to claim 12, wherein the light leakage preventing portion is constituted by applying a paint to the light guide.

25. The illumination apparatus according to claim 12, wherein the light leakage preventing portion is constituted by processing the light guide into a sawtooth shape.

26. The illumination apparatus according to claim 12, wherein the light leakage preventing portion is constituted by depositing a metal to the light guide.

27. The illumination apparatus according to claim 12, wherein the light source is disposed in the end portion of the light guide.

28. The illumination apparatus according to claim 12, wherein the light source has the different light emitting colors.

29. The illumination apparatus according to claim 12, wherein the light source is an LED.

30. An illumination apparatus comprising a light source; and
a light guide for guiding light from the light source in a longitudinal direction and radiating the light to illuminate an object to be illuminated,
wherein the light guide comprises a diffuser for diffusing and/or reflecting the light from the light source along the longitudinal direction of the light guide and a radiator for radiating the light diffused and/or reflected by the diffuser in a predetermined direction, and wherein the diffuser and radiator arc arranged so that a normal line passing through the center of the width of the diffuser differs from the predetermined direction, and the light source is arranged on the normal line, when viewed from the side of the end surface of the longitudinal direction of the light guide.

31. The illumination apparatus according to claim 30, wherein the light source is arranged in the end portion of the light guide.

32. The illumination apparatus according to claim 31, wherein a sectional area of the light guide becomes smaller as a distance fain the arrangement position of the light source is increased, when viewed in the longitudinal direction of the light guide.

33. The illumination apparatus according to claim 30, wherein a sectional area of the light guide differs over the longitudinal direction, when viewed in the longitudinal direction of the light guide.

34. An illumination apparatus comprising:
a light source; and
a light guide built in a light guide cover comprising a light non-transmitting member, said guide being provided with a light transmitting member for guiding light from the light source in a longitudinal direction and radiating the light from a radiating surface of the light guide to illuminate an object to he illuminated, wherein a light leakage preventing portion for restricting light leakage is arranged around a part of a surface of the light guide, exposed from the light guide cover, other than the radiating surface.

35. The illumination apparatus according to claim 34, further comprising a diffuser for diffusing and/or reflecting the light from said light source in the longitudinal direction of the light guide, wherein the radiating surface radiates the light diffused and/or reflected by the diffuser in a predetermined direction.

36. The illumination apparatus according to claim 34, wherein a sectional area of the light guide changes over the longitudinal direction when viewed, from the side of an end surface of the longitudinal direction of the light guide.

37. The illumination apparatus according to claim 34, wherein a sectional area of the light guide becomes smaller as a distance from the arrangement position of the light source is increased, when viewed from the side of an end surface of the longitudinal direction of the light guide.

38. An image processing apparatus comprising:

an illumination apparatus comprising a light source, and a light guide for guiding light from the light source in a longitudinal direction and for radiating the light to illuminate an object to be illuminated;

an image forming element for forming the light from the object to be illuminated by said illumination apparatus into an image;

photoelectric converting device for photoelectrically converting the image from the image forming element and outputting an image signal;

a moving device for moving relatively said photoelectric converting device and the object; and a driving circuit for controlling said light source, wherein the light guide comprises a diffuser for diffusing and/or reflecting the light from the light source along the longitudinal direction of the light guide and a radiator for radiating the light diffused and/or reflected by the diffuser in a predetermined direction, and wherein the diffuser and the radiator are arranged so that a normal line passing through the center of the width of the diffuser differs from the predetermined direction, and the light source is ranged on the normal line, when viewed from the side of the end surface of the longitudinal direction of the light guide.

39. The illumination apparatus according to claim 38, wherein the light source is arranged in the end portion of the light guide.

40. The illumination apparatus according to claim 39, wherein a sectional area of the light guide becomes smaller as a distance from the arrangement position of the light source is increased, when viewed in the longitudinal direction of the light guide.

41. The illumination apparatus according to claim 38, wherein a sectional area of the light guide differs over the longitudinal direction, when viewed in the longitudinal direction of the light guide.

42. An image processing apparatus comprising:

an illumination apparatus comprising a light source, and a light guide built in a light guide cover, the light guide cover comprising a light nan-transmitting member, and being provided with a light transmitting member for guiding light from the light source in a longitudinal direction and for radiating the light from a radiating surface of the light guide to illuminate an object to be illuminated, wherein a light leakage preventing portion for restricting light leakage is arranged around a part of a surface of the light guide, exposed from the light guide cover, other than the radiating surface;

an image forming element for forming the light from the object to be illuminated by said illumination apparatus into an image;

photoelectric converting means for photoelectrically converting the light formed into the image by said image forming element and outputting an image signal;

a moving device for moving relatively said photoelectric converting means and the object; and a driving circuit for controlling said light source.

43. The illumination apparatus according to claim 42, further comprising a diffuser for diffusing and/or reflecting the light, from said light source in the longitudinal direction of the light guide, wherein the radiating surface radiates the light diffused and/or reflected by the diffuser in a predetermined direction.

44. The illumination apparatus according to claim 42, wherein a sectional area of the light guide changes over the longitudinal direction when viewed from the side of an end surface of the longitudinal direction of the light guide.

45. The illumination apparatus according to claim 42, wherein a sectional area of the light guide becomes smaller as a distance from the arrangement position of the light source is increased, when viewed from the side of an end surface of the longitudinal direction of the light guide.

* * * * *

UNITED STATES PATENT AND TRADEMARK OFFICE
CERTIFICATE OF CORRECTION

PATENT NO. : 6,661,497 B2
DATED : December 9, 2003
INVENTOR(S) : Masami Tabata et al.

It is certified that error appears in the above-identified patent and that said Letters Patent is hereby corrected as shown below:

Column 10,
Line 28, "images" should read -- image --.

Column 13,
Line 28, "ranged" should read -- arranged --.

Column 14,
Line 6, "nan-transmitting" should read -- non-transmitting --.

Signed and Sealed this

Sixth Day of July, 2004

JON W. DUDAS
*Acting Director of the United States Patent and Trademark Office*